(12) United States Patent
Nilsson et al.

(10) Patent No.: US 7,551,597 B2
(45) Date of Patent: Jun. 23, 2009

(54) METHODS AND APPARATUS FOR FAST DOWNLINK INFORMATION OF UPLINK OUT-OF-SYNCHRONIZATION

(75) Inventors: Johan Nilsson, Höllviken (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 585 days.

(21) Appl. No.: 11/118,568

(22) Filed: Apr. 29, 2005

(65) Prior Publication Data

US 2005/0250524 A1 Nov. 10, 2005

Related U.S. Application Data

(63) Continuation-in-part of application No. 10/840,518, filed on May 6, 2004, now abandoned.

(51) Int. Cl.
 *H04B 7/005* (2006.01)
(52) U.S. Cl. ............ 370/350; 370/311; 370/318; 370/324; 455/502; 455/522
(58) Field of Classification Search ............ 370/311, 370/318, 324, 350, 491, 500, 503, 331–332; 455/522, 69, 502, 515–517, 524–525, 436–444, 455/67.11, 67.13; 375/344, 295
See application file for complete search history.

(56) References Cited

U.S. PATENT DOCUMENTS

| 5,305,349 | A | 4/1994 | Dent |
| 6,363,104 | B1 | 3/2002 | Bottomley |
| 6,456,826 | B1 * | 9/2002 | Toskala et al. ............ 455/63.1 |
| 6,594,499 | B1 | 7/2003 | Anderson |
| 6,647,262 | B1 * | 11/2003 | Demetrescu et al. ........ 370/331 |
| 6,654,922 | B1 | 11/2003 | Numminen et al. |

(Continued)

FOREIGN PATENT DOCUMENTS

EP 0 933 962 A2 8/1999

(Continued)

OTHER PUBLICATIONS

International Search Report, Sep. 27, 2005, pp. 1-9, European Patent Office, Rijswijk, Netherlands.

(Continued)

*Primary Examiner*—Kamran Afshar
(74) *Attorney, Agent, or Firm*—Potomac Patent Group PLLC

(57) ABSTRACT

Information systems, detectors, and methods for a communication link, such as the downlink of a cellular telephone system, reduce the problem of uplink transmit power peaks when the uplink is out of synchronization (OoS). One method of indicating that a first link to a communication node is OoS includes the step of including an OoS signal in signals that are sent by the node on a second link. The OoS signal includes at least one data bit transmitted by the node that indicates that the first link is synchronized or OoS. A method of determining that a first link to a communication node is OoS includes the step of detecting an OoS signal in signals that are sent by the node on a second link. The OoS signal includes at least one data bit that indicates that the first link is synchronized or OoS.

8 Claims, 6 Drawing Sheets

U.S. PATENT DOCUMENTS

| | | | |
|---|---|---|---|
| 6,801,565 | B1 | 10/2004 | Bottomley et al. |
| 7,046,963 | B2 * | 5/2006 | Luo et al. ............... 455/67.11 |
| 2001/0028677 | A1 | 10/2001 | Wang et al. |
| 2002/0012321 | A1 * | 1/2002 | Rune et al. ................. 370/252 |
| 2003/0087660 | A1 * | 5/2003 | Sendonaris ................ 455/522 |
| 2003/0128673 | A1 * | 7/2003 | Lee et al. .................... 370/318 |
| 2004/0038698 | A1 * | 2/2004 | Muller et al. .............. 455/522 |
| 2004/0058700 | A1 | 3/2004 | Nilsson et al. |
| 2004/0087328 | A1 * | 5/2004 | Ronkainen ................. 455/522 |
| 2004/0246928 | A1 * | 12/2004 | Choi et al. .................. 370/335 |
| 2005/0026641 | A1 | 2/2005 | Hokao |
| 2005/0075122 | A1 * | 4/2005 | Lindoff et al. ............. 455/522 |
| 2005/0085249 | A1 * | 4/2005 | Goldstein et al. .......... 455/502 |
| 2005/0094816 | A1 | 5/2005 | Lindoff et al. |
| 2005/0105647 | A1 | 5/2005 | Wilhelmsson et al. |
| 2005/0250526 | A1 * | 11/2005 | Lindoff et al. ............. 455/522 |
| 2007/0072552 | A1 * | 3/2007 | Jonsson et al. ........... 455/67.11 |

FOREIGN PATENT DOCUMENTS

| | | |
|---|---|---|
| EP | 1 011 211 A1 | 6/2000 |
| EP | 1 317 078 A2 | 6/2003 |
| WO | WO 01/76277 | 11/2001 |

OTHER PUBLICATIONS

Written Opinion of the International Searching Authority, Sep. 27, 2005, pp. 1-8, European Patent Office, Rijswijk, Netherlands.

U.S. Appl. No. 10/839,926, Not Published, Lindoff et al.

3GPP Technical Specification 25.214 (V5.6.0) Rel. 5, Contents, pp. 3-5 (2003).

3GPP Technical Specification 25.214 (V5.6.0) Rel. 5, Section 5.1, pp. 13-23 (2003).

3GPP Technical Specification 25.214 (V5.6.0) Rel. 5, Annex B, pp. 58-59 (2003).

Turin, G., "Introduction to Spread-Spectrum Antimultipath Techniques and Their Application to Urban Digital Radio", Proc. IEEE, Mar. 1980, pp. 328-353, vol. 68, IEEE.

Wiberg, N. et al., "Combining of Power Control Commands During Soft Handover in WCDMA", Proc. 14th Int'l Symposium on Personal, Indoor and Mobile Radio Communication (PIMRC), Sept. 2003, pp. 1-5, IEEE.

"Minimum Requirements for TPC Combining in Soft Handover", T-Doc R4-040162, Feb. 9-13, 2004, pp. 1-4, 3GPP.

* cited by examiner

METHODS AND APPARATUS FOR FAST DOWNLINK INFORMATION OF UPLINK OUT-OF-SYNCHRONIZATION

This application is a continuation-in-part of U.S. patent application Ser. No. 10/840,518 filed on May 6, 2004 now abandoned.

BACKGROUND

This invention relates to communication systems having synchronized transmitters and receivers and more particularly to indicating to a transmitter loss of synchronization with a receiver and even more particularly to transmitters and receivers in radiotelephone systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focusses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio resource in CDMA systems, it is important that each physical channel does not use more power than necessary. This is achieved by a transmit power control (TPC) mechanism, in which, among other things, base stations send TPC commands to users. The TPC commands cause the users to increase or decrease their transmitted power levels by increments, thereby maintaining target signal-to-interference ratios (SIRs) for the dedicated physical channels (DPCHs) between the base stations and the users. WCDMA terminology is used here, but it will be appreciated that other systems have corresponding terminology. Scrambling and channelization codes and transmit power control are well known in the art.

FIG. 1 depicts a mobile radio cellular telecommunication system 10, which may be, for example, a CDMA or a WCDMA communication system. Radio network controllers (RNCs) 12, 14 control various radio network functions including for example radio access bearer setup, diversity handover, etc. More generally, each RNC directs mobile station (MS), or remote terminal, calls via the appropriate base station(s) (BSs), which communicate with each other through downlink (i.e., base-to-mobile or forward) and uplink (i.e., mobile-to-base or reverse) channels. RNC 12 is shown coupled to BSs 16, 18, 20, and RNC 14 is shown coupled to BSs 22, 24, 26. Each BS serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks such as the public switched telephone network (PSTN), the Internet, etc. through one or more core network nodes like a mobile switching center (not shown) and/or a packet radio service node (not shown).

As user terminals move with respect to the base stations, and possibly vice versa, on-going connections are maintained through a process of hand-off or handover. For example in a cellular telephone system, as a user moves from one cell to another, the user's connection is handed over from one base station to another. Early communication systems used hard handovers, in which a first cell's base station (covering the cell that the user was leaving) would stop communicating with the user just as the second base station (covering the cell that the user was entering) started communication. Modern systems typically use soft handovers, in which a user is connected simultaneously to two or more base stations. In FIG. 1, MSs 28, 30 are shown communicating with plural base stations in diversity handover situations. MS 28 communicates with BSs 16, 18, 20, and MS 30 communicates with BSs 20, 22. A control link between RNCs 12, 14 permits diversity communications to/from MS 30 via BSs 20, 22.

During soft handovers (SHOs), terminals receive TPC commands from more than one base station, and methods have been developed for handling conflicts between TPC commands from different base stations. Conflicts are expected because as the user terminal or equipment (UE) leaves one cell, that cell's base station receives a progressively weaker signal and thus that base station's TPC commands call for more power, and at the same time, the user terminal may be entering a new cell, and the new cell's base station receives a progressively stronger signal and thus the new base station's TPC commands call for less power. In a 3GPP-compliant system, the UE combines TPC commands from reliable downlinks with a logical OR function, which leads to reduced UE transmit power if any of the reliable commands says "DOWN". This is described in Section 5.1.2.2.2.3 of 3GPP TS 25.214 (V5.6.0) Rel. 5 (2003), Physical layer procedures (FDD).

Reliable "OR" TPC combining can be implemented in different ways in a UE, for instance by using reliability thresholds, which are described in N. Wiberg, H. Rong, F. Gunnarsson, and B. Lindoff, "Combining of power control commands during soft handover in WCDMA", *Proc. of the 14th Int'l Symposium on Personal, Indoor and Mobile Radio Communication (PIMRC)*, 2003. Other aspects of TPC are described in U.S. Pat. No. 6,594,499 to A. Andersson et al. for "Downlink Power Control in a Cellular Telecommunications Network".

Soft handover in WCDMA and other 3G communication systems involves an Active Set Update-ADD procedure that is described, for example, at 3GPP TS 25.214 cited above. The UE reports event 1A (Radio Link Addition) to the network and the RNC informs the new base station, node B, to start uplink (UL) synchronization. When an acknowledgement message from the node B is received in the RNC, an "Active Set Update—ADD" message is transmitted to the UE, and simultaneously, the new node B starts to transmit on the downlink (DL). Until UL synchronization is achieved, the TPC commands transmitted by node B on the new DL call for the UE to increase its transmitted power; according to Section 5.1.2.2.1.2 of TS 25.214, the TPC command sequence is . . . 11111 . . . . The UE receives and decodes the "Active Set Update-ADD" message, and after that the terminal's physical layer starts to combine the DL information, including TPC commands, from node B and the "old" base station, node A.

UL synchronization when entering or adding a link in soft handover can take 100 milliseconds (ms) or even more, depending on channel conditions. This delay is mainly due to node B's having no knowledge of the UE, which forces node B to search over its entire cell, and to the typically low power of node B's received UL signal and the low number of UL DPCCH pilot symbols, which forces node B to receive a large number of symbols before reliable channel and path estimates are obtained.

In order to reduce this time delay, which contributes to the period during which TPC on the new UL and DL is open-loop, the physical layer (Layer 1) in node B gets Layer-3 information from the RNC to start UL synchronization before the Layer-3 "Active Set Update" message is transmitted to the UE. Although the amount of improvement due to this for node B is not easily calculated, there has been an indication in at least one RNC log of a delay of only 30-40 ms. The UL (node B) has at least two other timing advantages over the DL in establishing sync: the Active Set Update message is itself 20 ms long, and then the UE needs time to process it. The UE's processing time depends on the UE's architecture and on the current load on the real-time processing units in the terminal. A further delay of 30-50 ms might occur in a terminal before the terminal starts to combine the new DL information on Layer 1. The sum of these delays in the DL is about 100 ms, which means that the start of UL synchronization can be expected to occur at least about 100 ms before DL synchronization (sync) occurs. The end of UL sync, however, can occur after the UE has received the active set update message and started to combine power control commands from the new base station. In this situation, there is a risk of control loop problems, in the form of UL power peaks, i.e., too large UL power, or UL power dips, i.e., too small UL power.

Field experiments have shown a phenomenon during soft handovers that is apparently not prevented by current TPC methods. When a terminal or user equipment enters or adds a communication link in a soft handover, peaks of 20-40 dB in the uplink (UE-to-base) transmitted power can be observed if the initial downlink power on the new link is set too high and if the new node B fails to achieve uplink synchronization within 30-40 ms from the time the UE starts to combine downlink TPC commands (i.e., after receiving and processing the "Active Set Update" message). It has also been observed in field trials that there is some risk that a communication link established in SHO goes Out of Sync (OoS) after the link has been in sync. If this happens, the link would usually be resynchronized in a procedure that is the same as the procedure in the initial sync case, and hence there will be a risk for large UL transmit power peaks.

TPC on the UL and DL of a new or resynchronized connection in a soft handover may operate open-loop for 100-200 ms due to the time needed for UL synchronization, and such lengthy delays appear to be the main cause of the peaks in the transmitted power. These power peaks are interference to other users, and thus can cause problems for the users and the system as a whole. UL sync detection methods and apparatus are described in U.S. patent application Ser. No. 10/839,926 filed on May 6, 2004, by B. Lindoff et al. for "Synchronization Detection Methods and Apparatus".

SUMMARY

Therefore, it is desirable to have an OoS information system and detector for the DL that reduces the problem of UL peaks in such scenarios.

In one aspect of Applicants' invention, a method of indicating that a first communication link is out of synchronization includes the step of including an OoS signal in signals that are sent on a second communication link. The OoS signal includes at least one data bit transmitted that indicates that the first communication link is synchronized or OoS.

In another aspect, a method of determining that a first communication link is OoS includes the step of detecting an OoS signal in signals that are sent on a second communication link. The OoS signal includes at least one data bit that indicates that the first communication link is synchronized or OoS.

In a further aspect, a communication node adapted to transmit and receive electromagnetic signals includes a detector adapted to determine whether a first received link is synchronized; and a device, responsive to the detector, adapted to include an OoS signal in signals transmitted on a second link. The OoS signal includes at least one data bit that indicates that the first received link is synchronized or OoS.

In another aspect, a communication terminal adapted to transmit and receive electromagnetic signals includes a device adapted to recover information, including pilot symbols and transmit power control (TPC) commands, from electromagnetic signals received on a first link; a control unit adapted to control a power level of electromagnetic signals transmitted by the terminal on a second link based on the TPC commands; and a detector adapted to monitor recovered information for an OoS signal in signals received on the first link, wherein the OoS signal includes at least one data bit that indicates that the second link is synchronized or OoS.

In yet another aspect, a communication system includes at least one base station adapted to propagate and receive electromagnetic signals, wherein the electromagnetic signals include at least one common pilot channel (CPICH) and at least one dedicated physical channel (DPCH); and at least one user equipment adapted to propagate to and receive electromagnetic signals from the at least one base station. The user equipment includes a device adapted to recover information from the CPICH and the DPCH, including pilot symbols and TPC commands; and a control unit adapted to control a power level of a transmitter in the user equipment based on the TPC commands. The base station includes a detector adapted to determine whether an uplink (UL) from the user equipment is synchronized; and when the detector determines the UL is OoS, the base station alters the DPCH pilot symbols propagated to the user equipment.

In still another aspect, a method of indicating that a first link to a communication node is OoS includes the steps of checking, by the node, whether the UL is OoS; if the first link is synchronized, transmitting pilot symbols having a first scale factor on a second link; and if the first link is OoS, transmitting pilot symbols having a second scale factor on the second link.

In a further aspect, a method of controlling transmit power on a first link to a communication node includes the steps of detecting a scale factor of pilot symbols received on a second link, in which if the first link is synchronized, pilot symbols having a first scale factor are detected, and if the first link is OoS, pilot symbols having a second scale factor are detected;

if pilot symbols having the second scale factor are detected, limiting TPC commands received on the second link in a TPC command combination; and if pilot symbols having the first scale factor are detected, including TPC commands received on the second link in the TPC command combination.

In yet another aspect, a method in a user equipment of determining that an UL to a communication node is OoS includes the steps of comparing newer TPC commands to older TPC commands received from the node; if an output signal generated from the comparing step exceeds a threshold, measuring a signal-to-interference ratio (SIR) for a DL from the node; and determining, based on the measured SIR, whether the node is following TPC commands sent to the node in the UL. If the node is not following the TPC commands, OoS is determined.

BRIEF DESCRIPTION OF THE DRAWINGS

The various features, objects, and advantages of Applicants' invention will be understood by reading this description in conjunction with the drawings, in which.

DETAILED DESCRIPTION

Figure 1:
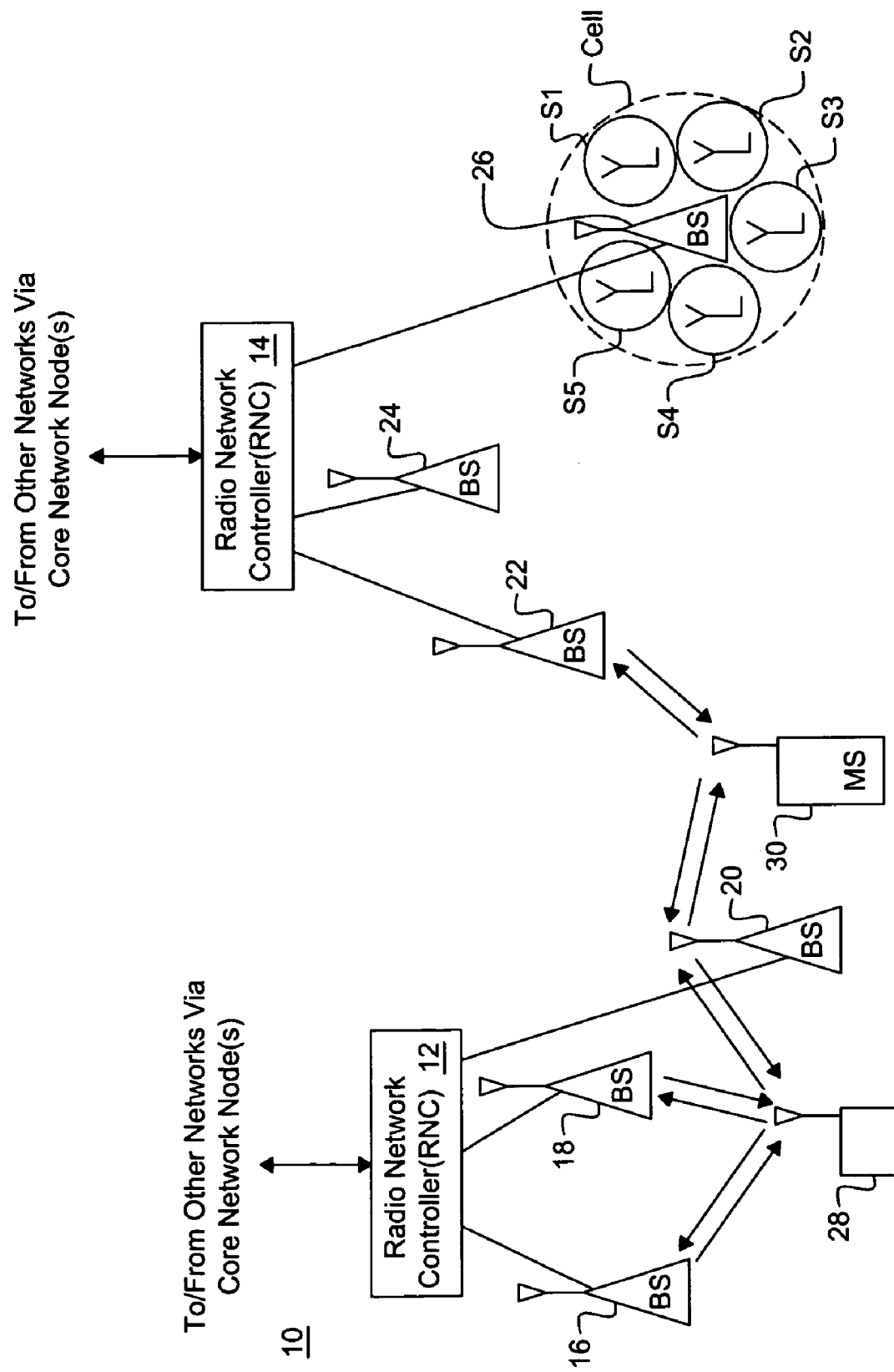
FIG. 1 depicts a communication system.

This invention describes a method of decreasing the risk of UL transmit power peaks when an uplink that has been in sync goes out of sync. For convenience, this description is focussed on a WCDMA system, but it will be understood that the invention is not limited to such systems.

One way for a UE to know that its UL is OoS at a node, such as a base station, is to introduce an UL OoS signal into the control signals that are exchanged by at least that node and the UE. Such control signals could be one or more data bits transmitted by a node, in particular a node B, that would tell the UE that the UL between the UE and that particular node B is in sync or out of sync. For example, data bit(s)=1 may indicate in sync and data bit(s)=0 may indicate out of sync. With such control signals, the UE would detect the transmitted in/out-sync bit(s), and as long as the bit(s) indicates an in-sync condition, the UE would include the TPC command stream from that node B in its TPC command combination. If OoS were detected by the UE's detecting the OoS bits, the UE would stop including or reduce its reliance on the TPC commands from that node B. Thus, the base station (i.e., a receiver) indicates to the UE (i.e., a transmitter) loss of synchronization, and the transmitter acts on the indication.

This kind of indication, which is only a single bit of information, can readily be implemented as a change-of-sign of predetermined symbols and in other ways described in more detail below. In a communication system such as a WCDMA system, conveniently available predetermined symbols are the pilot symbols transmitted by a BS on the UE's dedicated physical channel (DPCH). The BS also transmits pilot symbols on a common pilot channel (CPICH), and a UE typically uses the CPICH pilot symbols in estimating the impulse response of the radio channel to the BS. It will be recognized that the UE uses the CPICH pilots for channel estimation, rather than the DPCH pilots, due to the CPICH's typically higher signal-to-noise ratio, but the UE still uses the DPCH pilots, mainly for SIR estimation, i.e., for DL power control.

Accordingly, the UE advantageously compares the signs of the CPICH pilot symbols to the signs of the DPCH pilots. If the UE determines that the signs are different, the UE has determined that its UL is OoS (or vice versa, of course), and then the UE may exclude TPC commands sent by that node from combination with TPC commands from other BSs. When the base station determines that the UL is in sync, the base station makes the signs of its DPCH pilot symbols the same (or different, of course) as the signs of its CPICH symbols. The UE detects the change (e.g., the UE determines that the DPCH and CPICH pilot symbols have the same signs), and starts listening to that base station's TPC commands.

Indicating OoS in this way should be easy to implement in many current networks, and since no higher level signaling is needed during OoS periods, OoS detection and response can be fast. To ensure compatibility with UEs that do not take advantage of these indications, a UE should inform the base station in its Layer 3 control signaling that the UE has the fast OoS information capability described in this application. For instance, a UE can indicate that it has this capability by including a suitable flag, information element, or message in the connection setup messaging.

Figure 2:
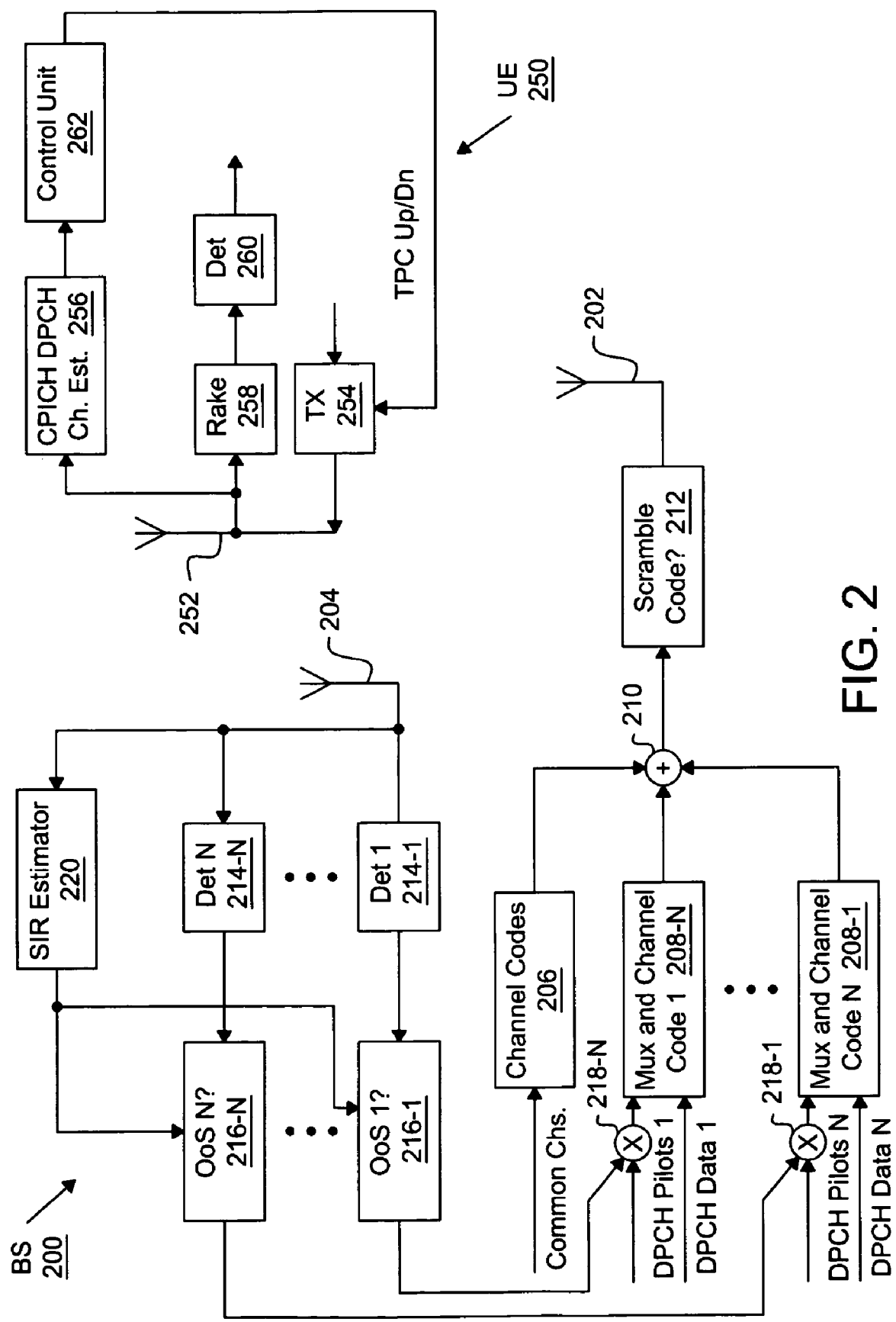
FIG. 2 is a block diagram of a base station and a receiver in accordance with Applicants' invention.

FIG. 2 is a block diagram of a communication system in accordance with Applicants' invention that includes a base station 200 and a user equipment UE 250. The communication system would typically include a number of base stations that may communicate with the UE simultaneously, for example during a soft handover, and each of these base stations can be identified by a suitable index i.

Base stations typically include a transmit antenna 202 that propagates electromagnetic signals to the UE 250 and other remote terminals and a receive antenna 204 that receives electromagnetic signals sent by the UE 250 and other remote terminals. It will be appreciated that although the antennas 202, 204 are shown as separate, they need not be. As described above, the signals sent by the base station 200 in a system like a WCDMA system include a number of common channels, such as the CPICH, which are combined with the base station's channel codes in use by a coder 206. The number of dedicated channels N transmitted by a base station at any particular instant may be produced by respective multiplexer/channel coders 208-1, . . . , 208-N, each of which combines a data stream for a dedicated channel with known pilot symbols. The outputs of the coders 206, 208-1, . . . , 208-N are combined, for example by a suitable summer 210, and the result is combined with a predetermined scrambling code by a suitable device 212, such as an EX-OR combiner. This result is then provided, after appropriate up-conversion and amplification as necessary, to the transmit antenna 202.

The UE 250, such as a mobile terminal in a WCDMA communication system, typically transmits and receives radio signals through an antenna 252. These signals are generated by a suitable transmitter 254 that takes base-band information and up-converts it to radio frequencies and a receiver portion that down-converts and samples received signals. As schematically depicted in FIG. 2, signals received by the antenna are provided to a channel estimator 256 that de-spreads the common pilot channel and the UE's dedicated physical channels, recovers the pilot symbols included on the CPICH and DPCH, determines received signal levels if desired, and estimates the impulse response of the radio channel. Based on some of this information, a rake combiner 258 combines echoes of received data and provides an output signal to a symbol detector 260 that produces information that is further processed as appropriate for the particular communication system. It will be appreciated that although the antenna 252 is shown as a single antenna, it may be implemented as separate transmit and receive antennas.

Rake combining and channel estimation are well known in the art. Various aspects of rake receivers are described in G. Turin, "Introduction to Spread-Spectrum Antimultipath Techniques and Their Application to Urban Digital Radio", *Proc. IEEE*, vol. 68, pp. 328-353 (March 1980); U.S. Pat. No. 5,305,349 to Dent for "Quantized Coherent Rake Receiver"; U.S. Pat. No. 6,363,104 to Bottomley for "Method and Apparatus for Interference Cancellation in a Rake Receiver"; and U.S. Pat. No. 6,801,565 to Wang et al. for "Multi-Stage Rake Combining Methods and Apparatus"; and U.S. patent application Publication No. 2001/0028677 by Wang et al. for "Apparatus and Methods for Finger Delay Selection in Rake Receivers". Channel estimation is described in, for example, U.S. Provisional Patent Application No. 60/519,261 by L. Wilhelmsson for "Channel Estimation by Adaptive Interpolation".

Besides the CPICH and DPCH pilot symbols, the estimator 256 also recovers control symbols, including TPC commands from each node, such as the base station 200, to which the terminal is connected, and combines TPC command streams from each link in the UE's active set. Based on the detected commands, a control unit 262 generates a combined TPC command that is provided to the transmitter 254, which responds by increasing or decreasing the terminal's transmit power. If there is only one link in the active set, the combined TPC command is just the one detected TPC command stream for that particular link.

Several methods of determining and of combining TPC commands are known, such as those described in U.S. patent application Publication No. US 2004/0058700 by Nilsson et al. for "Methods, Receivers, and Computer Program Product for Determining Transmission Power Control Commands Using Biased Interpretation". The DL TPC pattern sent by a node, such as a node B, to the UE for control of UL power can be different in different networks. For example, even if the 3GPP specification indicates that an all-up TPC pattern should be used, a network may instead send a toggling pattern, i.e., a sequence of (up-down) pairs that may include "extra" up commands now and then. Toggling patterns are discussed in Section 5.1.2.2.1.2 of 3GPP TS 25.214.

Signals transmitted by remote terminals such as the UE 250 are received by the base station's receive antenna 204, the base station includes a number N of detectors 214-1, . . . , 214-N that process signals from respective remote terminals and recover the information that was sent. As is typical in a digital communication system, these detectors synchronize themselves to their respective signals. For various reasons, a detector 214 may lose synchronization, i.e., the detector goes out of sync. Out-of-sync conditions are advantageously sensed by respective OoS detectors 216-1, . . . , 216-N, although it will be appreciated that one or more OoS detectors can be shared among the received channels. The OoS detectors 216-1, . . . , 216-N produce respective output signals that are provided to combiners 218-1, . . . , 218-N, which combine the OoS signals with respective DPCH pilot symbol streams. Each OoS detector 216 can be implemented as a comparator that determines whether an estimate of the UL SIR is above a certain threshold; if it is, then the UL is in sync, and otherwise, the UL is OoS. SIR estimates for the UL channels 1-N are determined by a suitable processor 220, and a number of methods of estimating SIRs are well known in the art. The signal power S and the interference power I of a channel are usually estimated using pilot symbols, i.e., known symbols transmitted on one or more channels. SIR estimation is described for example in U.S. patent application Ser. No. 10/700,855 by J. Nilsson et al. for "Interference Estimation in CDMA Systems Using Alternative Scrambling Codes".

As described above, when an out-of-sync condition is sensed by an OoS detector 216, it's output signal changes in a way such that the DPCH pilot symbols change accordingly. For example, the OoS output signal may be +1 in the in-sync condition and −1 in the out-of-sync condition and the combiners 218 may be binary multipliers. The result is that the DPCH pilot symbols are multiplied by scale factor +1 when the base station's receiver is synchronized with the UE's transmitter and by scale factor −1 when it is not. It will be understood, of course, that the opposite could occur, i.e., multiplication by −1 when in-sync and by +1 when out-of-sync.

At the UE, the polarity of the DPCH pilot symbols is detected by the channel estimator 256 that recovers the pilot symbols included on the CPICH and DPCH from that base station. If the polarity is as expected for the in-sync condition, e.g., +1, a suitable indication is passed to the control unit 262, which can arrange for use of TPC commands from the base station in the UE's determination of its proper transmit power level. If the polarity is different from that expected, e.g., the opposite, a suitable indication is passed to the control unit 262, which can arrange for exclusion of TPC commands from the base station from the UE's determination of its proper transmitted power level.

Figure 3:
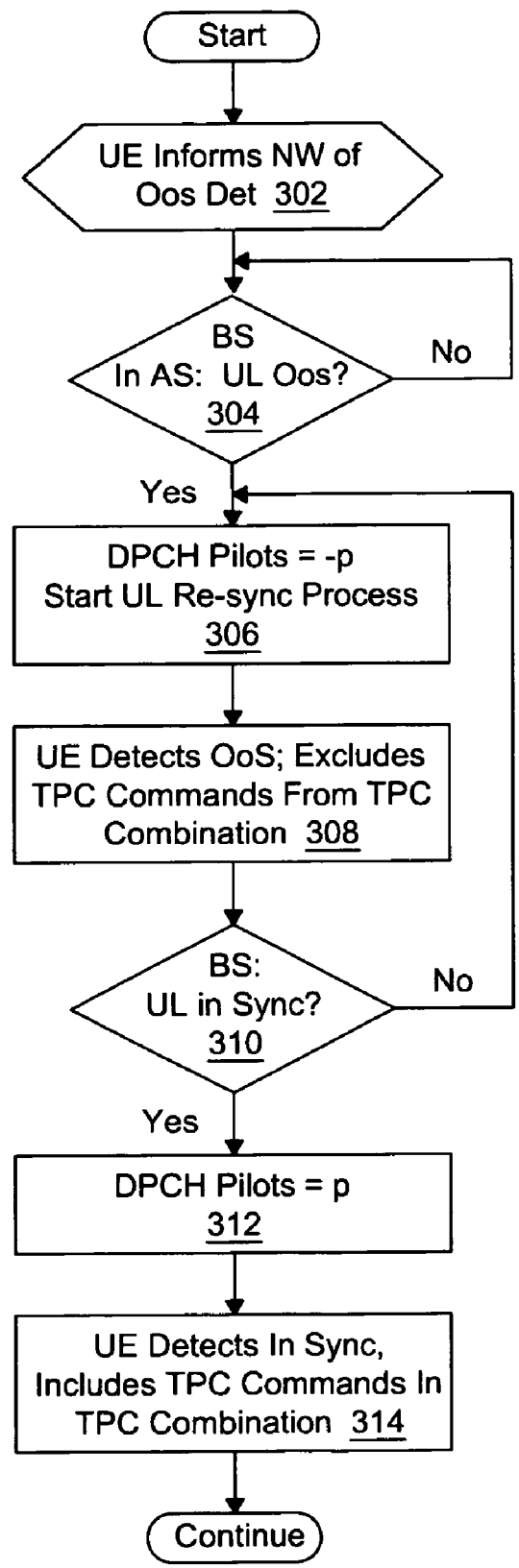
FIG. 3 is a flow chart of a method in accordance with Applicants' invention.

FIG. 3 is a flow chart of a method in accordance with Applicants' invention. In step 302, the UE informs the network of its fast OoS detection capability, for example by including an appropriate information element in messages exchanged during connection setup. If all UEs have Applicants' fast OoS detection capability or if a network is unconcerned with UE's lacking this capability, this preliminary step is unnecessary.

For example when a UE is in a SHO, a base station in the Active Set checks whether its respective UL from the UE is OoS (step 304). If the UL is in sync, the scale factor +1 is applied (multiplied) to the DL DPCH pilots p transmitted to the UE and the process flow returns to step 304. If the UL is OoS, the scale factor −1 is applied (multiplied) to the DL DPCH pilots p and a re-synchronization procedure is started (step 306). According to one re-sync procedure, the DL transmit power level is fixed at a particular level and a particular sequence of TPC commands, such as . . . , up, up, up, . . . or . . . , up, down, up, down, up, . . . , is transmitted in the downlink.

As described above, the UE detects the UL OoS condition, for example by examining either the pilot symbols p or the channel estimates obtained from the CPICH and DPCH (step 308). If OoS is detected, the UE does not use the DL TPC commands from the BS having the OoS UL in its TPC combination algorithm. In step 310, the BS checks whether the UL to that BS is in sync, and if it is not, the process flow returns to step 306 and the DPCH pilots p are transmitted with −1 scale factor. When the UL is in sync again, the BS changes the scale factor of its DPCH pilots to +1 (step 312). The UE detects the scale factor change, which indicates that its UL is in sync, and starts using TPC commands from that BS in its TPC command combination algorithm again (step 314).

Applicants' method of changing the scale factor of the DL DPCH pilot symbols when the UE's UL goes OoS in SHO can be implemented in all system operating modes in which channel estimates can be based on CPICH (primary or secondary CPICH) pilot symbols. Such modes include for instance normal mode (i.e., no beam-forming, where only DPCH pilots have to be used for channel estimation) and open-loop transmit diversity. Although the method is described above for the case in which an uplink goes out of sync, the method can also be used when a UE enters or adds a link in SHO. In such cases, the DPCH pilot symbols have, for example, a negative sign until the UL is in sync.

In cases where the CPICH can be used for DPCH channel estimation, it should be noted that the relationship between the channels is given by:

$$H_{i,j}^{DPCH} = \gamma_j H_{i,j}^{CPICH}$$

where $i=1, \ldots, N_P$ is the number of radio paths (i.e., signal fingers used in the Rake portion of the receiver) from $BS_j$ in the Active Set where $j=1, \ldots, N_{BS}$, and $\gamma_j > 0$ is a real-valued scale factor that is the same for all radio paths but different for different BSs. Hence, detecting a changed sign on the DPCH pilots is the same as detecting the sign of $\gamma_j$. Methods of estimating the scale factor γ are known, at least some of which are described in U.S. patent application Ser. No. 10/700,855 by J. Nilsson et al. cited above. Any suitable method may be carried out by the UE, for example, in the control unit 262.

Figure 4A:
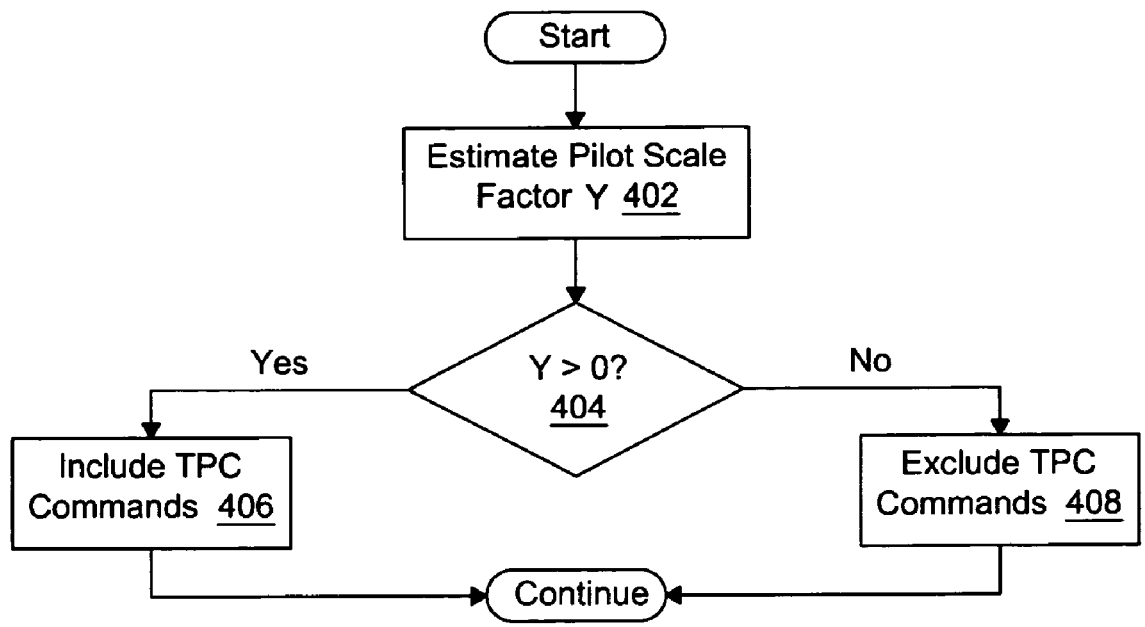
FIGS. 4A, 4B, 4C are flow charts of other methods in accordance with Applicants' invention.

For such cases, an exemplary OoS detection method is depicted in FIG. 4A and includes the step of estimating the scale factor $\gamma_j$ for each received slot and each base station $BS_j$ in the Active Set (step 402). If the estimated $\gamma_j > 0$, the UE uses the DL TPC commands from $BS_j$ in forming its TPC command combination (steps 404, 406). If the estimated $\gamma_j < 0$, the UE excludes the DL TPC commands from $BS_j$ from its TPC command combination (steps 404, 408).

Figure 4B:
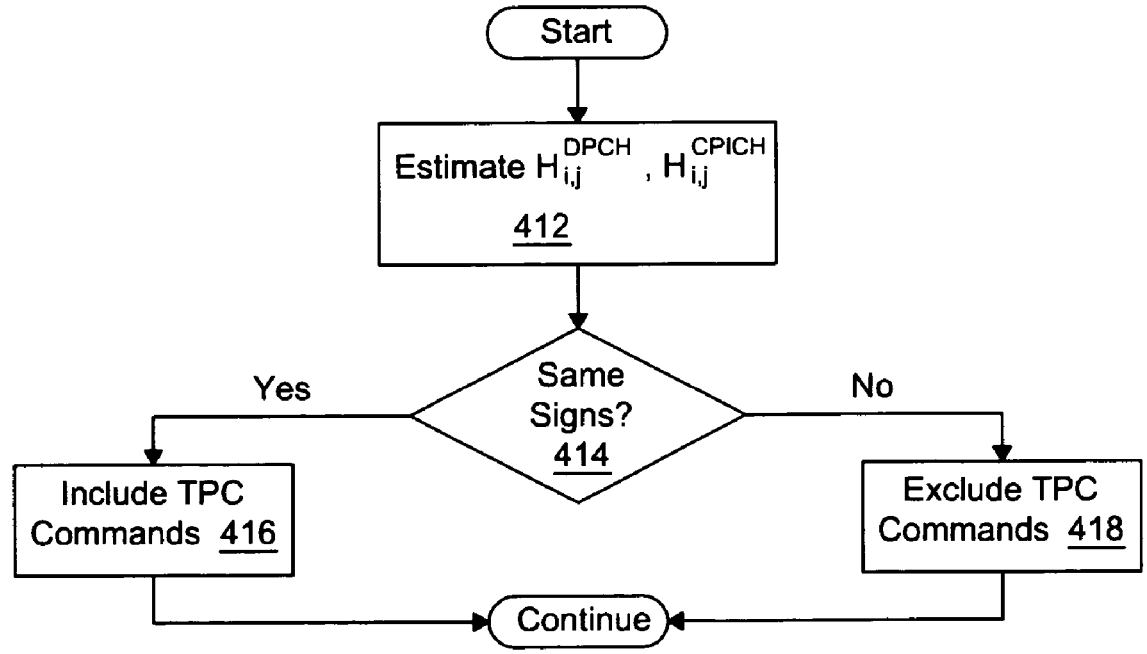

It will be appreciated that this method can be varied as depicted in FIG. 4B, for example, by estimating $H_{i,j}^{DPCH}$ and $H_{i,j}^{CPICH}$ (step 412) and comparing the signs of the DPCH and CPICH channel estimates (step 414). If the signs are the same for a $BS_j$, the DL TPC commands from the $BS_j$ are included in the TPC combination (step 416). If the signs are not the same, the DL TPC commands from $BS_j$ are excluded from the TPC combination (step 418).

In some communication systems, such as some WCDMA systems, it may not be possible to use the change-sign methods of FIGS. 4A and 4B for signaling OoS to the UE because some UEs may use the DPCH pilots for phase references in their detectors. Such systems can use the following signaling procedure, which recognizes that a BS may be free to transmit its DPCH pilots and/or TPC commands, or other data elements for that matter, with more (or less) power. Transmitting DPCH pilots and TPC commands at different power levels is permitted by the current WCDMA standard, for example, and these power offsets are defined with two parameters, PO3 for the pilots and PO2 for the commands.

A BS or other node can use these power offsets to signal UL OoS in the DL in the following way. If the UL is in sync, the PO2 and PO3 levels may be set equal, for example to a value of 0dB relative to data bits transmitted on the DPCH. If the UL is OoS, the PO2 level may be increased, for example to a value of +3 dB or +6 dB or another suitable value, while the PO3 level is kept unchanged. Of course it will be understood that instead the PO3 level could be increased and the PO2 level kept unchanged and that one level could even be reduced relative to the other level, although reduction may introduce other concerns.

All that remains is for the UE to estimate the power level offset between the DPCH pilots and TPC commands, or between other information elements included in the DL signal. That estimation can be done in several ways, based on either the received signal amplitude or the received signal power. In the following example, the PO2 signal amplitude changes +3 dB and the detection procedure is similar to the description above.

The relationship between the DPCH pilot channel and the TPC command channel is given by:

$$H_{i,j}^{TPC} u_{TPC,j} = \gamma_j^{TPC/DPCH} H_{i,j}^{DPCH}$$

where $i=1, \ldots, N_P$ is the number of radio paths (i.e., the number of signal fingers used in the Rake or G-Rake portion of the receiver) from $BS_j$ in the Active Set where $j=1, \ldots, N_{BS}$, and the gamma is given by:

$$\gamma_j^{TPC/DPCH} = \sqrt{2}$$

and is a real-valued scale factor that is the same for all radio paths from a particular BS but different for different BSs. Furthermore, $u_{TPC,j}$, is the TPC command from $BS_j$.

If the UL to $BS_j$ is in sync, then the scale factor $\gamma_j^{TPC/DPCH}=1$. The UE can estimate gamma using the techniques describes above that may be carried out, for example, in the control unit 262, assuming $u_{TPC,j}=1$ in the channel estimation procedure for the TPC channel estimate. Typically, the estimated value of gamma will be less than unity when the UL is in sync because TPC commands will be both +1, or "up", and −1, or "down", in the in-sync case.

If the UL to $BS_j$ is out of sync, then $\gamma_j^{TPC/DPCH}=\sqrt{2}$. The UE estimates the scale factor gamma as before, and the estimated value of gamma should be about $\sqrt{2}$ because the TPC "up" command, or +1, is always or almost always transmitted from $BS_j$ when the UL is OoS.

The UE then needs only to determine whether its estimate of gamma is about $\sqrt{2}$ or is less than that in order to detect whether its UL is in sync of OoS. It will be understood that changing the signs of the "up" and "down" commands in this example does not change the basic principle of operation.

Figure 4C:
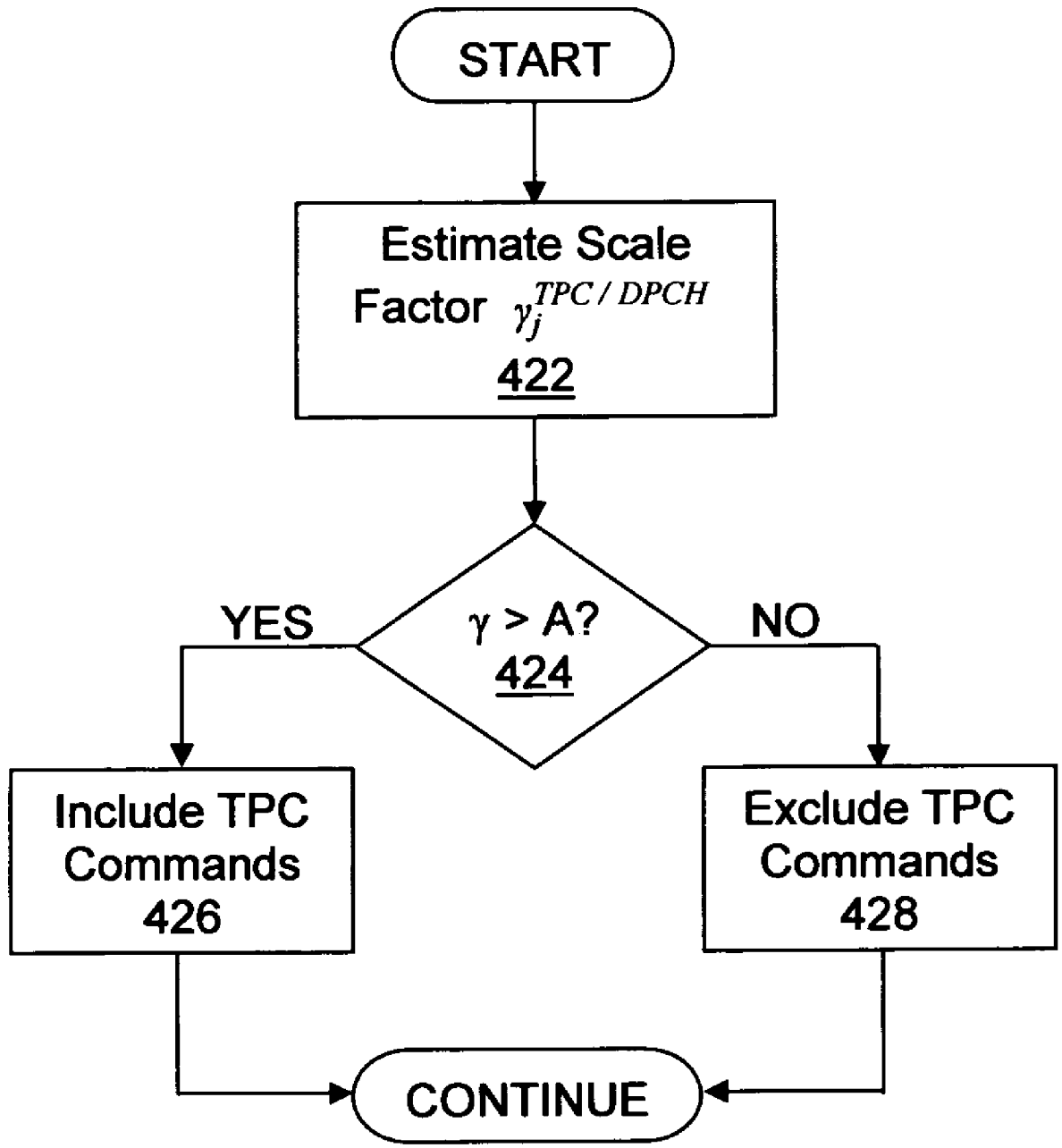

FIG. 4C depicts an exemplary OoS detection method that includes the step of, for each received slot and each BS in the Active Set, estimating the scale factor $\gamma_j^{TPC/DPCH}$ (step 422). If the estimate of the scale factor gamma is less than a threshold value A, then the UE uses the DL TPC commands from $BS_j$ in forming its TPC command combination (steps 424, 426). If the estimate of the scale factor gamma is greater than the threshold value A, the UE excludes the DL TPC commands from $BS_j$ from its TPC command combination (steps 424, 428).

The threshold A can be optimized in advance and be a function of the number of TPC commands and DPCH pilots in a slot, etc. The threshold A can also be a function of the spreading factor. Furthermore, hysteresis can be introduced in the detection process. For example, the UL may detect OoS if the gamma estimate is greater than about 0.7 and then detect in-sync only when the gamma estimate has fallen to less than about 0.3.

Figure 5:
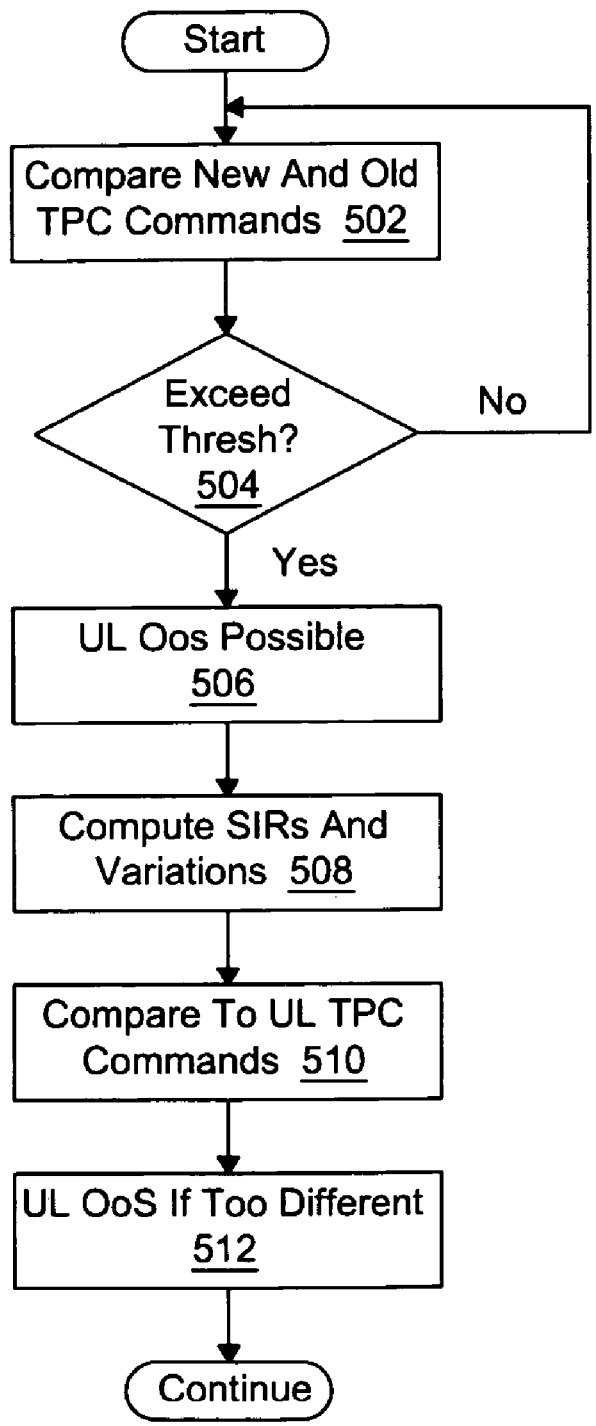
FIG. 5 is a flow chart of another method in accordance with Applicants' invention.

Applicants have recognized yet another way for a UE to know that its UL is OoS that does not need any modification of or extra control signaling. When a node B in SHO loses UL sync, the node typically freezes its DL power at a particular level because the node cannot "hear" TPC commands transmitted from the UE in the UL when the UL is OoS, and the node starts the re-synchronization procedure, e.g., the node transmits TPC commands calling for "up, up, . . . ". Thus and as depicted in FIG. 5, the control unit 262 or another suitable portion of the UE can compare newer TPC commands to older TPC commands received from each node B involved in a SHO, for example by calculating ratios between TPC commands during the latest and previous slots for each node B (step 502). If the output from any of these comparisons is above a threshold (step 504), then the node B corresponding to that comparison may be sending mostly "up" commands, and this can be taken as a sign that the UL may be OoS (step 506). In response to that indication, the UE measures the received SIR for the DL corresponding to that node B (step 508). If the UL is OoS, then the DL power will be constant and the received SIR for that link will be approximately constant, at least compared to the SIR from a node B that has UL sync and is therefore following the UE's TPC commands transmitted in the UL. By determining the variation, for example, of the SIR for that DL and comparing the variation to the UE's transmitted TPC commands (step 510), an OoS determination can be made. If the variance is below a threshold, meaning that the DL is not acting according to the UE's TPC commands, OoS is detected (step 512).

One can also look at the differences between SIRs of consecutive slots and correlate the differences to the TPC commands transmitted in the uplink. If the DL follows the transmitted TPC commands, the pattern of SIR variation should follow the pattern of the TPC commands. For example, if the pattern of TPC commands transmitted on the uplink is . . . , 1, −1, −1, 1, 1, . . . , then the SIR ideally should vary with the pattern . . . , SIR+1, SIR, SIR−1, SIR, SIR+1, . . . . It will be understood that SIR is just the value before the first TPC command shown in this example. Due to fading channels and different pathloss values for the downlinks, however, the SIR's variation pattern would likely not duplicate the TPC command pattern exactly. Therefore, it would be advantageous to pass the SIR variation pattern through a filter and provide the filter output to a correlator that would compare the filtered variation pattern to the expected pattern. A comparator would compare the correlation output to a suitable threshold, and if the correlation exceeds the threshold, then the DL is following the transmitted TPC commands; otherwise, an OoS condition is determined. Conventional finite impulse response (FIR) or infinite impulse response (IIR) filters having a time constant of about 20-100 ms (i.e., a few frames) and a suitable threshold that can be determined empirically can be readily implemented by a suitably programmed processor, such as the processor 262.

It will be appreciated that procedures described above are carried out repetitively as necessary, for example, to respond to time-varying characteristics of communication channels between transmitters and a receiver. To facilitate understanding, many aspects of Applicants' invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicants' invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of determining that a first communication link is out of synchronization (OoS), comprising the step of detecting an OoS signal in signals that are sent on a second communication link, the OoS signal indicating that the first communication link is either synchronized or OoS, wherein the OoS signal comprises:
    a change-of-sign of at least one symbol transmitted on the second communication link, or
    a power level offset between information elements included in a signal sent on the second communication links;
    wherein if the OoS signal indicates that the first communication link is synchronized, transmit power control commands from the second communication link are included in determining a transmit power level on the first communication link, and if the OoS signal indicates the first communication link is OoS, transmit power control commands from the second communication link are excluded from determining the transmit power level on the first communication link.

2. The method of claim 1, wherein the at least one symbol is a pilot symbol transmitted on a dedicated physical channel (DPCH).

3. The method of claim 2, wherein when the first communication link is synchronized, the signs of DPCH pilot symbols are the same as the signs of pilot symbols transmitted on a common pilot channel (CPICH), and the method further includes the step of comparing signs of such DPCH pilot symbols to signs of CPICH pilot symbols.

4. The method of claim 1, wherein the information elements include pilot symbols transmitted on a dedicated physical channel and transmit power control commands.

5. A communication terminal adapted to transmit and receive electromagnetic signals, comprising:
    a device adapted to recover information, including pilot symbols and transmit power control (TPC) commands, from electromagnetic signals received on a first link;
    a control unit adapted to control a power level of electromagnetic signals transmitted by the terminal on a second link based on the TPC commands; and
    a detector adapted to monitor recovered information for an out of synchronization (OoS) signal in signals received on the first link, the OoS signal indicating that the second link is synchronized or OoS, wherein the OoS signal comprises:
  a change-of-sign of at least one symbol transmitted on the second link, or
  a power level offset between information elements included in a signal sent on the second link;
wherein if the OoS signal indicates that the first link is synchronized, transmit power control commands from the node are included in determining a transmit power level on the second link, and if the OoS signal indicates the first link is OoS, transmit power control commands from the node are excluded from determining the transmit power level on the second link.

6. The terminal of claim 5, wherein the at least one symbol is a pilot symbol transmitted on a dedicated physical channel (DPCH).

7. The terminal of claim 6, wherein when the second link is synchronized, the signs of DPCH pilot symbols are the same as the signs of pilot symbols received on a common pilot channel (CPICH), and the terminal further includes a comparator adapted to compare signs of such DPCH pilot symbols to signs of CPICH pilot symbols.

8. The terminal of claim 7, wherein the information elements include pilot symbols transmitted on a dedicated physical channel and transmit power control commands.

* * * * *

UNITED STATES PATENT AND TRADEMARK OFFICE
CERTIFICATE OF CORRECTION

| | | |
|---|---|---|
| PATENT NO. | : 7,551,597 B2 | Page 1 of 1 |
| APPLICATION NO. | : 11/118568 | |
| DATED | : June 23, 2009 | |
| INVENTOR(S) | : Nilsson et al. | |

It is certified that error appears in the above-identified patent and that said Letters Patent is hereby corrected as shown below:

In Column 12, Line 35, in Claim 1, delete "links;" and insert -- link; --, therefor.

Signed and Sealed this

Tenth Day of November, 2009

David J. Kappos
*Director of the United States Patent and Trademark Office*